a) uq = 1/2 (u1 − u2) b) ul = 1/2 (u1 − u2)
c) u1 = uq + ul d) u2 = uq − ul

C = C1 = C2
Ll = 16 Lq
2wl = wq

INVENTOR
MAX SCHLICHTE
BY Spee & Spee
ATTYS.

INVENTOR
MAX SCHLICHTE
BY Stiee & Stiee
ATTYS.

3,448,220

TRANSFER CIRCUIT INCLUDING A PARAMETRIC AMPLIFIER

Max Schlichte, Munich, Germany, assignor to Siemens Aktiengesellschaft, Berlin and Munich, Germany, a corporation of Germany Filed July 12, 1965, Ser. No. 471,088
Claims priority, application Germany, July 14, 1964, S 92,045
Int. Cl. H04j *1/00;* H03f *7/00*
U.S. Cl. 179—15 11 Claims

ABSTRACT OF THE DISCLOSURE

A transfer circuit including a parametric amplifier comprising a parametric flywheel reactance which is mounted between input and output scanning switches that are actuated at a scanning frequency and with a tap formed on the flywheel reactance to which a compensating circuit is connected. An input capacitor is connected to the input scanning switch and an output capacitor is connected to the output scanning switch. In a first embodiment the compensating circuit comprises a voltage divider in circuit with transistors and in the second embodiment the compensating network comprises a second inductive coil.

Copending application, Ser. No. 294,891, now Patent No. 3,378,640, filed July 15, 1963, discloses an amplifier for electric oscillations, in which the signal oscillations to be amplified are transmitted with the aid of a scanning switch to which there is allocated a flywheel reactance for low loss scanning, by means of a sequence of scanning samples, and in which the individual scanning samples are parametrically amplified with the aid of a coil acting as a flywheel reactance. We are dealing, therefore, with a parametric amplifier.

Through the invention there is achieved an improvement of such a parametric amplifier from which improvement there results several advantages. Thereby, first of all, in the amplification of signal oscillations there are avoided retroactions in the connections involving the signal oscillations, which otherwise appear in the form of reflections. There takes place an amplification even if the scanning samples delivered at two connections agree. Further, the degree of amplification of the amplifier is increased. The amplifier can, for all these reasons, be efficiently utilized for two-way amplification.

The invention relates, therefore, to an amplifier in which the signal oscillations to be amplified are transmitted with the aid of a scanning switch, to which for low loss scanning there is allocated a flywheel reactance, in the form of a sequence of scanning samples, and in which the individual scanning samples are parametrically amplified with the aid of a coil acting as a flywheel reactance. This amplifier is characterized by the feature that over a tap of the coil there flows a compensation current branching over the coil without evoking any magnetization, and which in each case compensates the current draw or current feed which, in consequence of the parametric amplification, occurs additionally in each side or connection yielding a scanning sample. The parametric amplifier and scanning switch comprise a transfer circuit.

Through the above described compensation of the current draw or current feed at each side or connection delivering a scanning sample, the retroaction otherwise occurring there with the parametric amplification is avoided, for which reason no reflections occur. The compensation current acts at the supplied side or connection possibly as an additional current and has a consequent the raising of the degree of amplification. This amplification effect also occurs if the scanning samples supplied by the two sides are equal. If, on the other hand, no compensation current is delivered, the original coil provided for the parametric amplification is not traversed by a current, for which reason, in such case, a parametric amplification is not active. For all the above reasons, the parametric amplifier according to the invention is especially well suited for two-way amplification.

The parametric amplifier according to the invention is hereinafter explained in detail with the aid of the drawing, in which.

Figures 5, 6, 7, 8, 9:
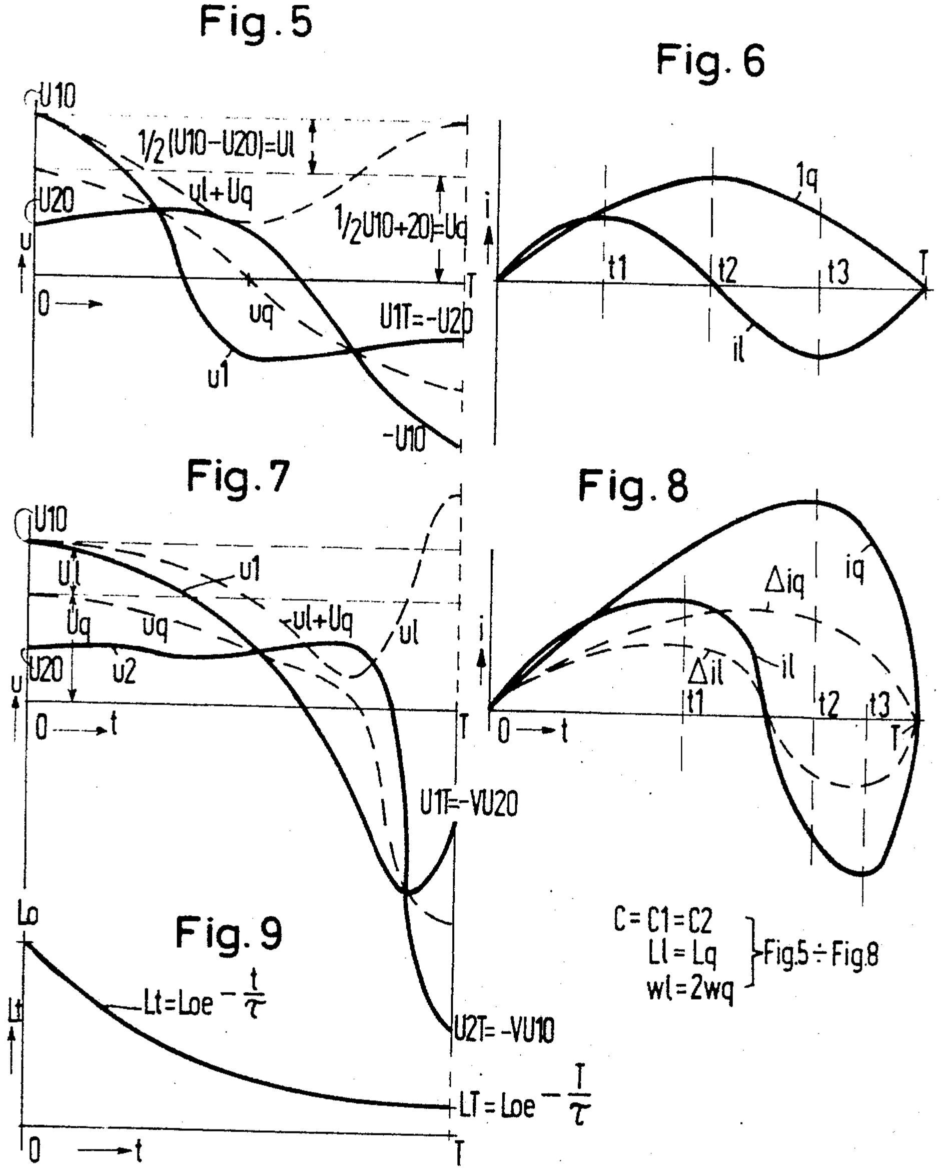

FIGS. 6 and 8 correspondingly illustrate the course of currents in the coils belonging to the amplifier; and FIG. 9 is a diagram which will be of aid in connection with an expedient modification of the inductance of the coils used for the parametric amplication.

Figure 1:
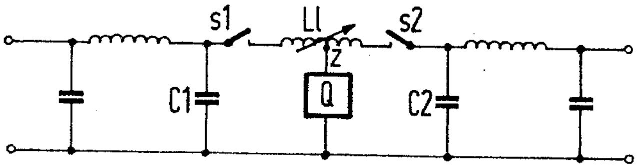
FIG. 1 represents a basic circuit diagram of the parametric amplifier according to the invention.

First of all, with the aid of FIG. 1, there is explained the manner of operation of a parametric amplifier which is improved according to the invention. Such parametric amplifier has, first of all, the coil L*l* acting as a flywheel reactance. This inductance, as indicated by an arrow, is variable for the parametric amplification. With the aid of the scanning switch, consisting of the two sections S1 and S2, scanning samples of the signal oscillations which occur at the side or connection provided with the capacitor C2, and are amplified by means of the coil L*l*. This is accomplished through the fact that, by reduction of the inductance of coil L*l* during the transmission of a scanning sample, the associated current flowing over coil *Ll* is increased. The duration of a scanning sample is in each case such that exactly one-half oscillation in the oscillating circuit formed by the capacitors C1 and C2 takes place, as well as coil L*l*. Without parametric amplification there is transferred merely the electrical charge lying on the capacitor C1 to the capacitor C2. Now if, as a result of the parametric amplification, there takes place an increase of the current flowing through the coil L*l*, there is fed to capacitor C2 a greater charge than otherwise. This additional charge is associated with an additional current draw or current feed at the side supplying the scanning sample, which corresponds to the amount of current necessary for the additional charge. This has as its consequence that the capacitor C1 lying at the side delivering the scanning sample is discharged or charged to a greater extent than otherwise. If it previously had a positive charge, it is then more greatly discharged. If previously it had a negative charge it is then more highly charged. There here occurs, in this case, also an additional charge, which charge acts generally in a troublesome manner on the signal source supplying this side or connection, since it corresponds to a reflection of the signal oscillation there delivered.

According to the invention there now flows over the tap Z of coil L*l* a compensation current branching over this coil, which is delivered by the circuit element there connected. The location of the tap Z at the coil L*l* is so selected that the branching compensation current does not evoke any magnetic field. On opening of the scanning switch consisting of the two sections S1 and S2, therefore, the compensation current can be interrupted without it being necessary for a magnetic field in the coil L*l* evoked by the compensation current to dissipate. The dissipation of a magnetic field possibly present would have as its consequence, namely, the occurrence of an interference voltage. This, however, is here avoided by suitable choice of the location of the coil tap. The compensation current is now so dimensioned that the current draw or current feed which occurs in consequence of the parametric amplification, is additionally compensated at the capacitor C1. The troublesome reflection of the signal voltage is, therefore, here avoided at the side provided with the capacitor C1. For compensation of the current or current feed, however, only a part of the whole compensation current delivered is utilized. The other part of this compensation current flows to the capacitor C2 and there changes the charge on the latter. This change corresponds now, just as well as the current draw or current feed to be compensated, to the scanning sample to be transmitted. It means, therefore, an increasing of the amplification of the parametric amplifier, which is obviously to be regarded as an additional advantage.

As a result of the symmetry of the circuit, in the same manner, without any reflection occurring, a scanning sample can be transmitted from the side or connection provided with the capacitor C2 to the side or connection provided with C1. Both transmissions described above may also take place simultaneously. There results, then, especially if the capacitors C1 and C2 have the same capacitance, a two-way amplifier which has for both directions the same and, in particular, high degree of amplification and in which all reflections of the transmitted signal oscillations are avoided. As already mentioned, the compensation current has as its consequence that even in the case of delivery of equal magnitude scanning samples through the two sides to be connected there takes place an amplification.

The repeated transmission of scanning samples makes it possible, as described in the above referred to copending application, and copending application Ser. No. 249,982, filed Jan. 4, 1963, that in a supplied side or connection the signal oscillations occurring at the supplying side or connection are recovered in their original form, in which, however, they have an amplitude increase in correspondence to the degree of amplification.

Figure 2:
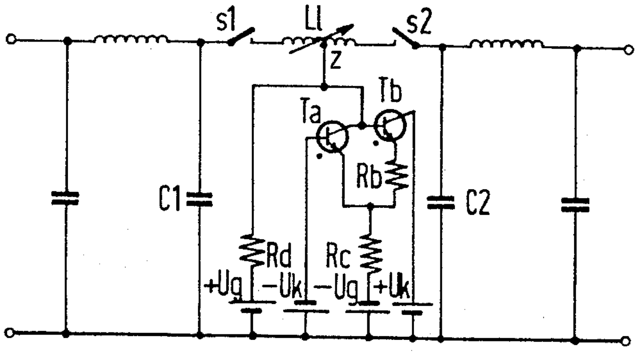
FIGS. 2 and 3 illustrate examples of circuits embodying the invention.

The circuit element, with the aid of which the compensation current is delivered, can be constructed in various ways. An example is illustrated in FIG. 2. The compensation current is supplied, according to this example, with the aid of a bipole acting as negative conductance, which is connected to the tap Z of coil L*l*. This bipole contains two transistors disposed in a voltage divider and operative in the working state.

The resistors R*d* and R*c* belonging to such voltage divider, and connected in series, lie between the voltages +UG and —U*g*. These voltages which are great as compared to the voltages occurring at the sides or connections and, thereby, also great as compared with the voltages occurring at the tap Z of the coil L*l*. Between the two resistors R*d* and R*c* there are inserted the two transistors T*b* and T*a*. the n-p-n transistor T*b* being inserted with its control current path, which is here represented by a base emitter circuiting, between the two resistors R*d* and R*c*, in which system also the working resistor R*b* also transversed by the control current, is connected in series therewith. This working resistance is determinative for the magnitude of the resulting negative conductance. The n-p-n transistor T*a* is inserted with its main current path, therefore with collector emitter circuiting, between the two resistors R*d* and R*c*. There thus results a connecting point between the two resistors and the two transistors, at which point there is connected the base of the transistor T*b* and the collector of the transistor T*a*. Further, at this connecting point, there is also connected the tap Z of the coil L*l*.

On the collector of the transistor T*b* there lies a voltage equaling the voltage occurring at the upper variation limit of the voltage occurring at tap Z, which equalizing voltage is here designated with +UK. At the base of the transistor T*a* there lies a voltage equaling the voltage occurring at the lower variation limit, which equalizing voltage is designated as —U*k*. It should further be noted that while it is recommended that the resistors R*d* and R*c* be made large as compared to the working resistance R*b*, the required compensation current must, however, still be deliverable. If the voltage 0 volts lies on the tap Z, a voltage, therefore, which lies in the middle between the voltages —U*l* and +U*k*, there then exists a certain current flow over the voltage divider, both transistors, as previously stated, being in the operating state. Over the resistor R*d* there flows the main current of transistor T*a* and the control current of the transistor T*b*. Over the resistor R*c* there flows, besides these currents, also the main current of transistor T*b*. If the voltage lying on tap Z now becomes somewhat more positive, the base of transistor T*b* then also becomes more positive. Its emitter, on the other hand, is still, as before, over the resistor R*b*, under the influence of the voltage —U*k*, which lies not only on the base but also on the emitter of the transistor T*a*, since this is in operating state. This is constantly the case within the variation range of the voltage lying on the tap Z. Over transistor T*b*, therefore, there flows a greater main current than previously. The current flowing over the resistor R*c* is here always constant, since it lies between the constant voltages —U*k* and —U*g*. The current now flowing additionally over transistor T*b*, therefore, previously had to flow over the transistor T*a*, which, however, is no longer the case. Instead of this, such current now, as before, delivered over the resistor R*d*, flows as a compensation current over the coil L*l*. It has, then, in the remaining parts of the amplifier represented in FIG. 2 the same effect as the compensation current in the amplifier illustrated in FIG. 1, for which the action of such compensation current has been thoroughly explained. The compensation current likewise is all the greater the more positive the voltage lying on the tap Z. It compensates, therefore, for example, the additional current draw occurring during a scanning sample at the initially positively charged capacitor C1. Corresponding effects appear when the voltage lying on tap Z is more negative than 0 volts.

The bipole acting as a negative conductor can also be constructed with p-n-p transistors in a corresponding manner, instead of with n-p-n transistors. In each case we are dealing with a new and not obvious bipole.

Figure 3:
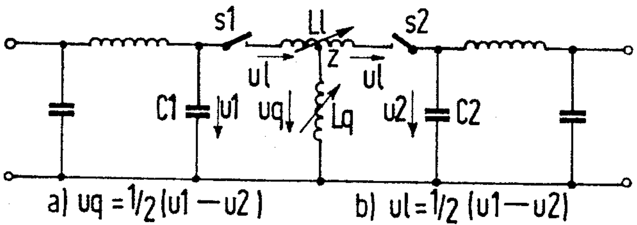

In FIG. 3 there is illustrated another example of how the circuit element Q delivering the compensation current can be constructed. The compensation current is delivered with the aid of the additional coil L*q* serving as a parametric amplifier. It is connected to the tap Z of the coil L*l* acting as flywheel reactance and forms, with capacitors C1 and C2, an oscillation circuit which is added to the oscillatory circuit formed by the capacitors C1 and C2 and the coil L*l* acting as flywheel reactance. During a scanning sampling there flows over the additional coil L*q* a current which functions as compensation current if the two above mentioned oscillatory circuits are correctly tuned. For this purpose one of the two oscillatory circuits is to be so tuned that for the duration of a scanning sampling it executes an even number of half oscillations and the other of the two oscillatory circuits is so tuned that it executes during this period an odd number of half oscillations. This tuning requirement allows a large number of pairs of individual frequencies for the two oscillatory circuits.

Figure 4:
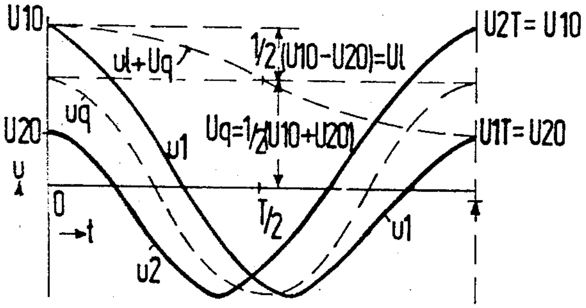
FIGS. 4, 5 and 7 are diagrams illustrating the course of the voltages occurring at the terminals to be connected under various conditions for the duration of a scanning sample in the amplifier according to FIG. 3.

The half oscillations occurring in the two oscillatory circuits and the resulting course of the voltages which occur at the capacitors C1 and C2 are described, first of all, for two examples of construction of this circuit, in which especially few half oscillations appear. There, first of all, in order to facilitate understanding, the presence of the parametric amplification with the aid of the two coils L*l* and L*q* is disregarded. The course of the voltages mentioned during the period of a scanning sample is illustrated in FIGS. 4 and 5. FIG. 4 relates to the embodiment in which the oscillatory circuit containing the coil L*l* functioning as flywheel reactance, the series oscillatory circuit of the capacitor C1, the coil L*l* and the capacitor C2, in the duration of the scanning sample execute a half oscillation, and the oscillating circuit containing the additional coil L*q*, the oscillatory circuit, therefore, of the coil L*q* and the parallel circuit of the capacitors C1 and C2 executes during this period two half oscillations.

FIG. 5 relates, on the other hand, to the embodiment in which the oscillatory circuit containing the coil L*l* acting as flywheel reactance, and the series oscillatory circuit comprising the capacitor C1, the coil L*l* and the capacitor C2, executes for the duration of a scanning period two half oscillations and the oscillatory circuit containing the additional coil L*q*, and the oscillatory circuit comprising the coil L*q* and the parallel circuit of the two capacitors C1 and C2 executes during this period a half oscillation.

There will now be described in detail the processes taking place for the duration of a scanning sample according to the voltage diagram illustrated in FIG. 4, in which the properties of the appertaining oscillatory circuits are also taken into account. The series oscillatory circuit of capacitor C1, the coil L*l* and the capacitor C2 has, if the capacitance of the like capacitors C1 and C2 is designated as C, the circuit frequency $$\omega 1^2 = \frac{2}{Li \cdot C}$$

For the circuit frequency $\omega q$ of the oscillatory circuit which is formed with the coil L*q* and the parallel circuit of capacitors C1 and C2 there results, in corresponding manner $$\omega q^2 = \frac{1}{2Lq \cdot C}$$

Since the currents flowing through coil L*q* traverse the two parts of coil L*l* in opposite direction, no magnetic field is evoked by these currents, and this coil therefore has no influence on the circuit frequency of the oscillatory circuit containing the parallel circuit of capacitors C1 and C2. Since here, for the duration of a scanning sample, the series oscillatory circuit C1–L1–C2 executes a half oscillation and the oscillatory circuit L2–C1–C2 executes two half oscillations, the appertaining circuit frequencies are related as follows: $2\omega l = \omega q$. A simple computation immediately yields the result, that the inductances of the coils used are related as follows $Ll = 16\ Lq$.

The voltages appearing in the diagram according to FIG. 4 also include those for the circuit according to FIG. 3. On the capacitor C1 there lies the voltage *ul*, on coil L*q* there lies the voltage *uq* and on each half of coil L*l* there lies the voltage *ul*. From the circuit diagram illustrated in FIG. 3 there can be derived, with observance of the polarity of the various voltages, the following voltage equations:

(a) $uq = \frac{1}{2}(u1 + u2)$
(b) $ul = \frac{1}{2}(u1 - u2)$
(c) $u1 = uq + ul$
(d) $u2 = uq - ul$ At the start of the scanning sampling, existing from time point 0 to time point T (see FIG. 4), there lies on capacitor C1 the voltage U10 and on the capacitor C2 the voltage U20. The voltage U10 composed of two parts, of which the one lies on the left hand half of coil L*l* and, therefore, according to Equation b, has the magnitude $Ul = \frac{1}{2}(U10 - U20)$. The other part lines on the coil L*q* and has according to Equation a the magnitude $Uq = \frac{1}{2}(U10 + U20)$. The subdivision of the voltage U10 into these two parts also appears in the diagram according to FIG. 4. There the course of the voltage U*q* lying on coil L*q* also is deposited from the time point 0 to the time point T. It presents, from the time point 0 to time point T, two half oscillations, which commence with the amplitude U*q* and cease with the same amplitude.

From diagram FIG. 4 there can also be seen the course of the voltage *u*1, which lies always on a half of coil L*l*, in which case, to be sure, for the same of clarity, in each case there has been added the constant voltage U*q*, so that there the voltage *ul* plus U*q* is represented. The course of this voltage produces, between time point 0 and time point T, a half-oscillation, which begins with amplitude U1 and ends with amplitude —U1. From the course of these two above described voltages it is now possible to ascertain according to Equations c and d the course of the voltages *u*1 and *u*2 between the time points 0 and T by simple addition and subtraction. The resulting curves, appearing in the diagram according to FIG. 4, are designated as *u*1 and *u*2. It then results that at time point T there lies on capacitor C1 the voltage $U1T = U20$ and on capacitor C2 the voltage $U2T = U10$, which means that the two capacitors have exchanged their voltages. Therefore, not only is a scanning sample from capacitor C1 transferred from capacitor C2 but also from capacitor C2 to capacitor C1. An amplification, however, is not to be seen, since the alteration of the inductance of the two coils L*l* and L*q* thus far have not yet been taken into account.

Before this is done, first of all there will be described the course of the voltages as it results from the diagram according to FIG. 5, where $u = f(t)$. For the corresponding circuit the same equations are valid which were previously set up with, however, one exception. This is the equation which relates to the ratio of the circuit frequencies of the two oscillatory circuits. Here, instead of the Equation 2 $\omega 1 = \omega q$, there now holds the equation $\omega 1 = 2\omega q$. There thus now results for the ratio of the inductances of the two coils $Ll = Lq$.

In the diagram according to FIG. 5 there is plotted the course of the same voltages as in the diagram according to FIG. 4. Accordingly, there lies on the capacitor C1 at time point 0 the voltage U10 and on the capacitor C2 the voltage U20. For the further course of the voltages it must be taken into account, however, that this time the oscillatory circuit containing the coil L*l* executes two half oscillations and the oscillatory circuit containing the coil L*q* executes only one half oscillation. Accordingly, the course of the voltage U*q*, which starts at the same value as in the diagram according to FIG. 4, presents between the time points 0 and T a one-half oscillation. The voltage *uq* has, therefore, at time point T the value —U*q*. The course of the voltage U*l* presents this time between the time points 0 and T two half oscillations. The voltage *u*1, therefore, has at time point T the same value as at time point 0; accordingly, also the voltage $ul = Uq$ appearing in the diagram of FIG. 5 has the same value at both these time points. In the drawing there is also presented the whole course of the voltages appearing at the two capacitors between the time points 0 and T, therefore the voltages *u*1 and *u*2, here result exactly as in the diagram of FIG. 4 according to Equations *c* and *d*. Since, however, the course of the voltages *uq* and *u*1 is different than in diagram of FIG. 4, here the course of the voltages *u*1 and *u*2 is different than there. It results that at the time point T the voltage *u*1 has the value $U1T = U20$ and the voltage *u*2 has the value $u20 = U10$. At time point T, therefore, also here on capacitor C1 there now lies the voltage which previously lay on capacitor C2 and vice versa, in which situation, of course, the polarity of the voltages has changed. In the transmission of oscillations, however, this circumstance has no troublesome influence. It results, therefore, that in both examples of execution described above there takes place a voltage exchange between the sides or connections delivering the signal oscillations, in one case, there taking place additionally a change of the polarities of the voltages.

In FIG. 7 now there is illustrated a diagram in which the course of the voltage shown in the diagram of FIG. 5 is represented for the case in which through alteration of the inductance of the coils a parametric amplification is evoked. As already stated, in this example of execution the circuit frequency $\omega l$ is twice as great as the circuit frequency $\omega q$. In the alteration of the inductances of the two coils the ratio of the two circuit frequencies must in each case be preserved, so that after expiration of the time span provided for a scanning sample both oscillatory circuits again occupy the same oscillation state. Since during the parametric amplification the inductance of the two coils is reduced and thereby the circuit frequencies of the oscillatory circuits rise, it is necessary, insofar as the duration of the scanning sample represented in FIG. 5 has to agree with the scanning sample represented in FIG. 7, to initially provide a greater inductance of the coils when parametric amplification, than is utilized when such parametric amplification is not present. In the course of the scanning sample the circuit frequencies of the two oscillatory circuits rose. During the course of the half oscillations occurring the amplitude of the oscillations simultaneously change, which increases more and more. This is clearly to be perceived in the course of the voltages in the diagram of FIG. 7.

It has proved that besides the condition of maintaining the ratio of the circuit frequencies constant, still further conditions have to be observed. The parametric amplification effect, namely, because of the various individual frequencies of the oscillating circuits and of the consequent changing relations of the currents which flow through the coils, is simultaneously different in these coils. Responsive thereto consideration must be taken in the alteration of the inductances of these coils, for example, by changing the inductance of each individual coil. It was possible to establish that all the conditions are also fulfilled if the inductance of both coils is steadily diminished and always in correspondence to the course of the same exponential function. With use of two coils with the same inductance L*t* there then results the course represented in FIG. 9

$$Lt = Loe\frac{-T}{\tau}$$

Here, L*o* is the initial value of the inductance and $\tau$ the selected time constant. For the time point T there then results that the inductance $$Lt = Loe - \frac{T}{\tau}$$

The smaller is the time constant the greater is the resulting amplification.

The course shown in FIG. 7 of the various voltages occurs if the inductance of the two coils is steadily altered, as illustrated in FIG. 9. For the parametric amplification per se, however, another suitable alteration of the inductance also could be provided.

The parametric amplification has as a consequence, that the amplitudes of the voltages represented in FIG. 7, in comparison to the corresponding voltages represented in FIG. 5, becomes greater and greater from the time point 0 to the time point T. The amplitudes resulting at time point T are, therefore, increased by a certain factor which is here designated as V, as compared to the amplitudes entered for this time point in the diagram of FIG. 5. The voltage lying on capacitor C1 at time point T, therefore, now is $U1T = VU20$, and the voltage lying on condenser C2 now is $U2T = VU10$. It is, therefore, not only a scanning sample that is transferred from capacitor C1 to capacitor C2 and from capacitor C2 to capacitor C1, but these scanning samples have also been simultaneously amplified by the factor V. The parametric amplifier has here acted as a two-way amplifier. Obviously it is also possible for it to be used, instead, as a one-way amplifier.

The increase of the voltage occurring on the coils, and thereby also of the voltages pertaining to the scanning samples on the capacitors, is brought about in the course of the parametric amplification by reduction of the inductance of the coils used, which in turn has as a consequence an increase in the current flowing over these coils. This effect per se is explained in detail in said application Ser. No. 294,891. With the aid of FIGS. 6 and 8 there is represented only the course of the currents flowing over the two coils L*l* and L*q* during the course of a scanning sample, in FIG. 6 for the case in which no parametric amplification takes place, and in FIG. 8 for the case in which through reduction of the inductance of these coils a parametric amplification is effected.

Considering first FIG. 6, in which is illustrated the one-half oscillation of the current *iq* flowing over the coil L*q* and two half oscillations of the current *il* flowing over coil L*l*, since at the time point 0 both sections S1 and S2 of the scanning switch are open, here both currents are interrupted. During the course of the scanning sample, they produce the intended half oscillations and at the end of the scanning sample are again interrupted, since at this time point T both sections S1 and S2 of the scanning switch are again open. The half oscillations occurring in each case are symmetrical. In FIG. 8 the same half oscillations are represented which are devised from the currents *iq* and *il*. These half oscillations, however, are no longer symmetrical, since from the time point 0 to time point T the frequency and the amplitude of the oscillations increase steadily. In FIG. 8 there are included two more curves in broken lines, which are designated with $\Delta iq$ and $\Delta il$ and in which the current course is covered if only the increase of the circuit frequency is taken into account but not the increase of the amplitude. While in the current curves which are now presented in FIG. 6 the maxima and minima of the current curves at the time points *t*1 and *t*2 and *t*3 follow one another at constant intervals, the intervals of the corresponding time points *t*1, *t*2 and *t*3 diminish with the time, according to the increase of the circuit frequency. This holds in FIG. 8 for all the current courses represented. In the course of currents *iq* and *il* there also occurs an increase of the oscillation amplitude. But here, too, all the currents vanish at the time points 0 and T, since both sections S1 and S2 of the scanning switch are closed only during the intervening time span, but are otherwise open. It should be further remarked that as a rule of the factor of increase for the oscillation amplitudes of the currents does not agree with the increase factor for the oscillation amplitudes of the voltages.

The diagram represented in FIG. 7 is devised in the same manner as the diagram represented in FIG. 5, presents voltage courses with parametric amplification, and it is possible from the diagram represented in FIG. 4 to derive a corresponding diagram for the corresponding case including parametric amplification. It results then, for the appertaining example of execution, in a corresponding manner, that an amplification takes place of the voltages belonging to the scanning samples. A representation of these curves would not show anything particular, so that it is here deemed unnecessary.

It should be further remarked that completely analogous processes take place if at the beginning there is a negative charge on one or on both capacitors. In this case, too, a current feed is compensated.

In the above described examples of execution of the one circuit frequency was in each case twice as great as the other circuit frequency. The same effects occur when other relations of the circuit frequency are present. The voltages lying on the two capacitors at time point T, remain in each case unaltered if in the diagrams represented in FIGS. 4, 5 and 7 one of the two oscillations or both oscillations execute a whole number of oscillations cycle more. If, for example, the oscillatory circuit having the coil L*q* now executes, between time points 0 and T, intsead of one oscillation as is represented in FIG. 4, two oscillations, there then lies on coil L*q* at time point T the same voltage as before. The voltages occurring on the two capacitors C1 and C2 at this time point T, therefore, are likewise the same as otherwise. In a corresponding manner, each of the voltage curves represented for the voltages *uq* and *ul* may have any number of additional oscillation cycles, with no possibility that at time point T the voltages occurring on capacitors C1 and C2 will have a different magnitude. In all these cases, however, the condition is fulfilled that the one oscillatory circuit executes for the duration of a scanning sample an even number of half oscillations and the other oscillatory circuit executes during this period an odd number of half oscillations. It is, however, especially expedient to provide two half oscillations for the oscillatory circuit having the coil L*l* and one half oscillation for the oscillatory circuit having the coil L*q*, since then, as it has been ascertained, generally there occurs an especially low current load on the scanning switch consisting of the two sections S1 and S2.

The above described improved parametric amplifier according to the invention is a circuit arrangement which, with the aid of scanning samples, brings about an impulsewise energy transmission. Such arrangements are needed in various area of engineering. They may form, for example, components of impulse generators (see "Pulse Generators" by Glasoe and Lebacqz, 1948, pages 307 to 308, FIGS. 8.17 and 8.18: "Proc. IEE" vol. 98, 1951, part III, page 185 to page 187, especially FIG. 3(*a*); "Nachrichtentechnik" (Signal Engineering), 1963, No. 1, page 101). Switch arrangements of this type are also of great importance in communication engineering, particularly as components of the time multiplex communication systems, where they are used for the connection of line sections (see "Ericsson Review"; 1956, No. 1, page 10). Also in transmission technology such arrangements are of importance. Thus, they are usable in a transmission device for multichannel programs for radio purposes, where they correctly distribute the signals belonging to two different stereo channels to the line sections involved (see DBP 1,084, 329). It should be remarked, further, that examples of execution of how a coil in which the inductance is to be varied can be constructed are described in said application Ser. No. 294,891. These examples of execution may also be used for the improved parametric amplifier according to the invention.

Changes may be made within the scope and spirit of the appended claims which define what is believed to be new and desired to have protected by Letters Patent.

I claim:

1. An amplifier comprising,
an input scanning switch,
an output scanning switch,
said input and output scanning switches operated at a scanning frequency,
a parametric flywheel reactance coil connected between said input and output scanning switches, and
a compensation circuit connected to a tap on said reactance coil and supplying a compensating current to said coil without substantially increasing the magnetic field of said coil and said compensating current compensating for the current fed through the output scanning switch.

2. An amplifier according to claim 1 comprising an input capacitor connected to said input scanning switch and an output capacitor connected to said output scanning switch.

3. An amplifier according to claim 1 wherein said tap is at the midpoint of said reactance coil.

4. An amplifier according to claim 1 wherein said compensation circuit comprises a two-terminal network with negative resistance.

5. An amplifier according to claim 4 wherein said two-terminal network comprises a pair of transistors with an electrode of one connected to an electrode of the other and to said tap, and a voltage divider connected in circuit with said transistors and comprising a first resistor connected to said tap and a second resistor connected to electrodes of said pair of transistors.

6. An amplifier according to claim 5, wherein said transistors are of the n-p-n type, and said tap is connected to the base of one transistor and to the collector of the other transistor, with voltage on the collector of the first transistor equaling the voltage at the upper variation limit of the voltage occurring at said tap and on the base of the other transistor there lies a voltage equaling the voltage occurring at the lower variation limit.

7. An amplifier according to claim 2 wherein said compensation circuit comprises a second coil serving as a parametric amplifier and one end is connected to said tap, the second coil and the input and output capacitors forming a first oscillatory circuit and said reactance coil and the input and output capacitors forming a second oscillatory circuit and one of said oscillatory circuits producing an even number of half-cycles and the other oscillatory circuit producing an odd number of half-cycles during a scanning period.

8. An amplifier according to claim 7 wherein said first oscillatory circuit produces two half-wave oscillations during the scanning period and the second oscillatory circuit produces one half-wave oscillation during the scanning period.

9. An amplifier according to claim 7 wherein the first oscillatory circuit produces one half-wave oscillation during the scanning period and the second oscillatory circuit produces two half-cycles during the scanning period.

10. An amplifier according to claim 7 wherein for parametric amplification during a scanning period the inductance of the reactance coil and the second coil are reduced exponentially.

11. An amplifier according to claim 10 wherein the inductance of the reactance coil and the second coil are equal and varied exponentially.

References Cited

UNITED STATES PATENTS 3,378,640 4/1968 Sabban et al.

FOREIGN PATENTS 999,231 7/1965 Great Britain.

RALPH D. BLAKESLEE, *Primary Examiner.*

U.S. Cl. X.R.

330—4.5